US009753768B2

(12) United States Patent
Chandrasekaran

(10) Patent No.: US 9,753,768 B2
(45) Date of Patent: Sep. 5, 2017

(54) INSTANT XVMOTION USING A PRIVATE STORAGE VIRTUAL APPLIANCE

(71) Applicant: VMWARE, INC., Palo Alto, CA (US)

(72) Inventor: Karthik Chandrasekaran, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 138 days.

(21) Appl. No.: 14/258,053

(22) Filed: Apr. 22, 2014

(65) Prior Publication Data

US 2015/0254103 A1    Sep. 10, 2015

(30) Foreign Application Priority Data

Mar. 8, 2014   (IN) .......................... 1192/CHE/2014

(51) Int. Cl.
*G06F 9/455* (2006.01)
*G06F 9/48* (2006.01)

(52) U.S. Cl.
CPC ........ *G06F 9/4856* (2013.01); *G06F 9/45558* (2013.01); *G06F 2009/4557* (2013.01)

(58) Field of Classification Search
CPC ........................... G06F 9/4856; G06F 9/45558
USPC ............................................................ 718/1
See application file for complete search history.

(56) References Cited

U.S. PATENT DOCUMENTS

| | | | | |
|---|---|---|---|---|
| 8,893,129 B1 * | 11/2014 | Havemose | ......... | G06F 11/1415 718/100 |
| 2005/0240558 A1 * | 10/2005 | Gil | ................... | G06F 17/30893 |
| 2007/0283348 A1 * | 12/2007 | White | ................... | G06F 9/4856 718/1 |
| 2008/0155223 A1 * | 6/2008 | Hiltgen | ............... | G06F 9/45558 711/173 |
| 2009/0199177 A1 * | 8/2009 | Edwards | ............. | H04L 67/1097 718/1 |
| 2011/0239213 A1 | 9/2011 | Aswani et al. | | |
| 2013/0326173 A1 | 12/2013 | Tsirkin | | |
| 2014/0063028 A1 * | 3/2014 | Diard | ...................... | G06F 9/455 345/520 |
| 2014/0208111 A1 | 7/2014 | Brandwine et al. | | |

(Continued)

OTHER PUBLICATIONS

Office Action Dated Sep. 2, 2016; U.S. Appl. No. 14/258,069; (42 pgs.).

(Continued)

*Primary Examiner* — Li B Zhen
*Assistant Examiner* — Bradford Wheaton

(57) ABSTRACT

Techniques for migrating a virtual machine (VM) from a source host system to a destination host system, where the VM is associated with a source virtual disk file (VMDK) residing in a local storage component of the source host system, are provided. In one embodiment, a virtual infrastructure (VI) server in communication with the source and destination host systems can create a shell directory in the local storage component of the source host system, where the shell directory includes a symbolic link to the source VMDK. The VI server can further promote the shell directory to a private virtual storage appliance (PSVA) running on the source host system. The VI server can then cause an execution state of the VM to be transferred from the source host system to the destination host system, without transferring the source VMDK between the host systems.

18 Claims, 10 Drawing Sheets

(56) References Cited

U.S. PATENT DOCUMENTS

| | | |
|---|---|---|
| 2014/0297979 A1 | 10/2014 | Baron et al. |
| 2015/0033220 A1 | 1/2015 | Venkat et al. |
| 2015/0134965 A1* | 5/2015 | Morenius ............... G06F 21/57 713/172 |
| 2015/0234617 A1 | 8/2015 | Li et al. |

OTHER PUBLICATIONS

Office Action Dated Mar. 24, 2016; U.S. Appl. No. 14/258,069; (33 pgs.).
Office Action Dated Feb. 8, 2017; U.S. Appl. No. 14/258,069; (49 pgs.).

* cited by examiner

INSTANT XVMOTION USING A PRIVATE STORAGE VIRTUAL APPLIANCE

RELATED APPLICATIONS

Benefit is claimed under 35 U.S.C. 119(a)-(d) to Foreign application Serial No. 1192/CHE/2014 filed in India entitled "INSTANT XVMOTION USING A PRIVATE STORAGE VIRTUAL APPLIANCE", filed on Mar. 8, 2014, by VMware, Inc., which is herein incorporated in its entirety by reference for all purposes.

BACKGROUND

"xvMotion" (also known as "Enhanced vMotion") is a technology that allows both the execution state and the virtual disk files (VMDKs) of a virtual machine (VM) to be migrated across host systems/data stores as a single operation. This enables VM migration in environments where the host systems do not have access to shared storage (and thus rely on host-based local storage). By way of example, FIG. 1A depicts a system environment 100 that includes two host systems 102 and 104 and a virtual infrastructure (VI) server 106. Each host system 102/104 includes, in turn, a hypervisor 108/110 and a local storage component 112/114. In the example of FIG. 1A, host system 102 runs a VM 116 on hypervisor 108 that is configured to access a VMDK 118 residing on local storage component 112.

Assume VI server 106 determines that VM 116 should be migrated from host system 102 to host system 104. In this scenario, VI server 106 can use xvMotion (as shown in FIG. 1B) to transfer both the execution state of VM 116 and its persistent data (i.e., VMDK 118) across the host systems. For instance, at step (1) of FIG. 1B (reference numeral 120), VI server 106 can cause host system 102 to background copy VMDK 118 (in the form of storage snapshots) to local storage component 114 of host system 104. Once VMDK 118 has been transferred, VI server 106 can cause host system 102 to copy the execution state (e.g., volatile memory contents) of VM 116 to host system 104 (step (2); reference numeral 122). Finally, at steps (3) and (4) (reference numerals 124 and 126), VI server 106 can halt the execution of VM 116 on host system 102 and restart VM 116 on host system 104, thereby completing the migration process.

While xvMotion solves the problem of performing VM migrations without shared storage, it also suffers from a number of drawbacks. First, the amount of time needed to transfer a VMDK from a source host system to a destination host system can be relatively long (e.g., on the order of minutes or hours), particularly if the VMDK is large and/or the network connection between the source and destination host systems is slow. This means that VM load balancing mechanisms (such as VMware's Distributed Resource Scheduler (DRS)) cannot reliably use xvMotion to relieve compute/memory pressures across host systems/clusters in real-time or near real-time. For example, consider a situation where host system 102 of FIG. 1A/1B experiences a temporary spike in CPU usage, which causes a DRS component of VI server 106 to conclude that VM 116 should be quickly offloaded via xvMotion to host system 104. In this case, due to the time needed to transfer VMDK 118 across the network, VI server 106 may be unable to complete the migration of VM 116 until the CPU spike on host system 102 has already passed (thereby rendering the migration ineffective for reducing host system 102's compute load).

Second, xvMotion generally requires that the destination host system have sufficient local storage capacity to hold the VMDK(s) of the VM being migrated. This can be problematic in "storage-imbalanced" clusters—in other words, clusters where some host systems have an abundance of local storage and other host systems have little or no local storage. An example of the latter type of host system is a diskless blade server. In these clusters, the host systems with little or no local storage may have significant compute/memory resources that cannot be leveraged by DRS because the host systems do not have enough local storage capacity to act as an xvMotion destination.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Figure 1A:
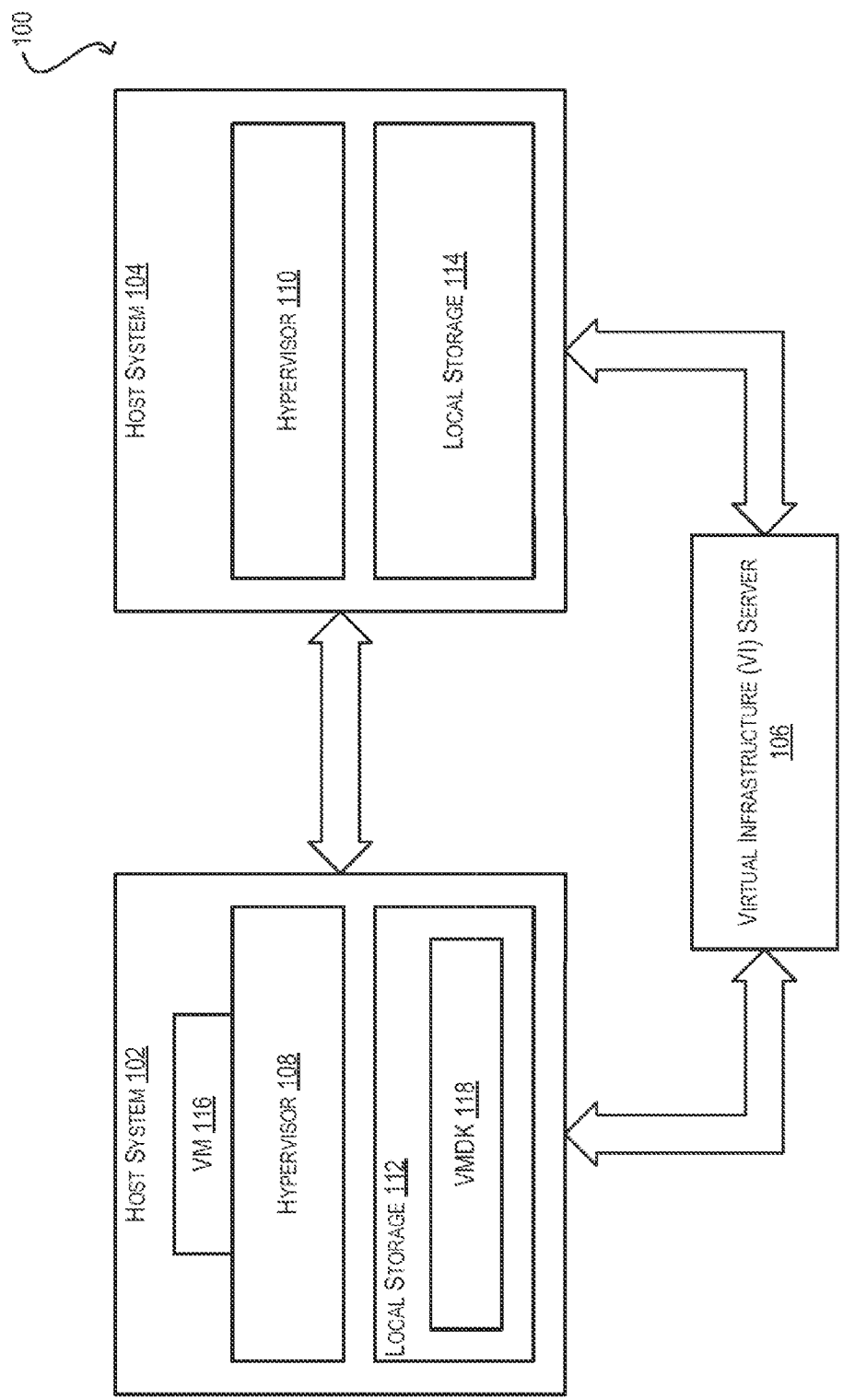
FIG. 1A depicts a system environment that supports xvMotion.
Figure 1B:
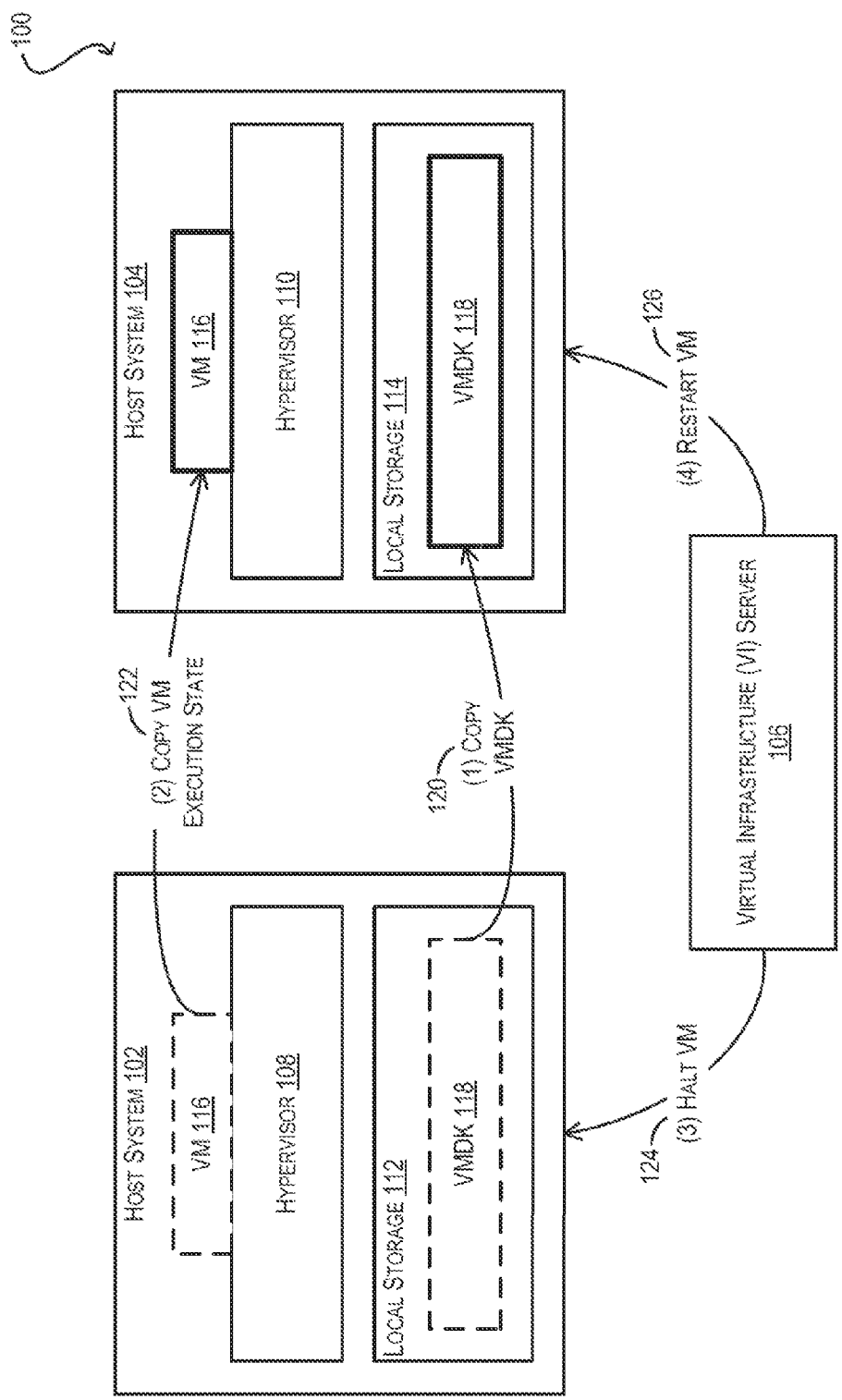
FIG. 1B depicts an xvMotion workflow.

The present disclosure describes an enhanced version of xvMotion (referred to herein as "instant xvMotion") that allows VMs to be migrated across host systems that do not have access to shared storage, without transferring the VMDKs of the VMs as part of the migration process. For instance, with respect to FIG. 1B, instant xvMotion can be used to migrate VM 116 from source host system 102 to destination host system 104, while eliminating the VMDK copy operation at step (1) (reference numeral 120). At a high level, this is achieved by enabling remote file access between host systems 102 and 104—in other words, establishing a connection between the systems that allows host system 104 to remotely access VMDK 118 residing on local storage component 112 of host system 102. With this remote access connection in place, when VM 116 is restarted on host system 104, host system 104 can fulfill VM I/O requests directed to VMDK 118 by interacting with host system 102 over the connection (rather than processing the I/O requests locally). In this way, host system 104 can avoid the need to maintain a copy of VMDK 118 on local storage component 114.

The instant xvMotion solution described above provides a number of advantages over conventional xvMotion. For example, since the only VM data that needs to be transferred from the source host system to the destination host system is the VM's execution state (which is typically much smaller in size than a VMDK), the time needed to complete the migration can be significantly shorter than xvMotion. This allows instant xvMotion to be leveraged by real-time load balancing mechanisms like DRS. Further, since the VMDK(s) of the migrated VM can remain at the source host system, there is no need for the destination host system to have a minimum amount of local storage capacity in order to hold the VMDK(s). Thus, instant xvMotion can be used to migrate VMs within, or across, storage-imbalanced clusters.

Instant xvMotion can be implemented in various ways that differ based on the manner in which remote file access is enabled between the source and destination host systems. Section 2 below describes a first instant xvMotion implementation that enables remote file access via a hypervisor-based client/server model, and Section 3 below describes a second instant xvMotion implementation that enables remote file access via a "private storage virtual appliance" (PSVA). It should be appreciated that other implementations are possible and are considered to be within the scope and spirit of the present disclosure.

2. Hypervisor-Based Client/Server Model

Figure 2A:
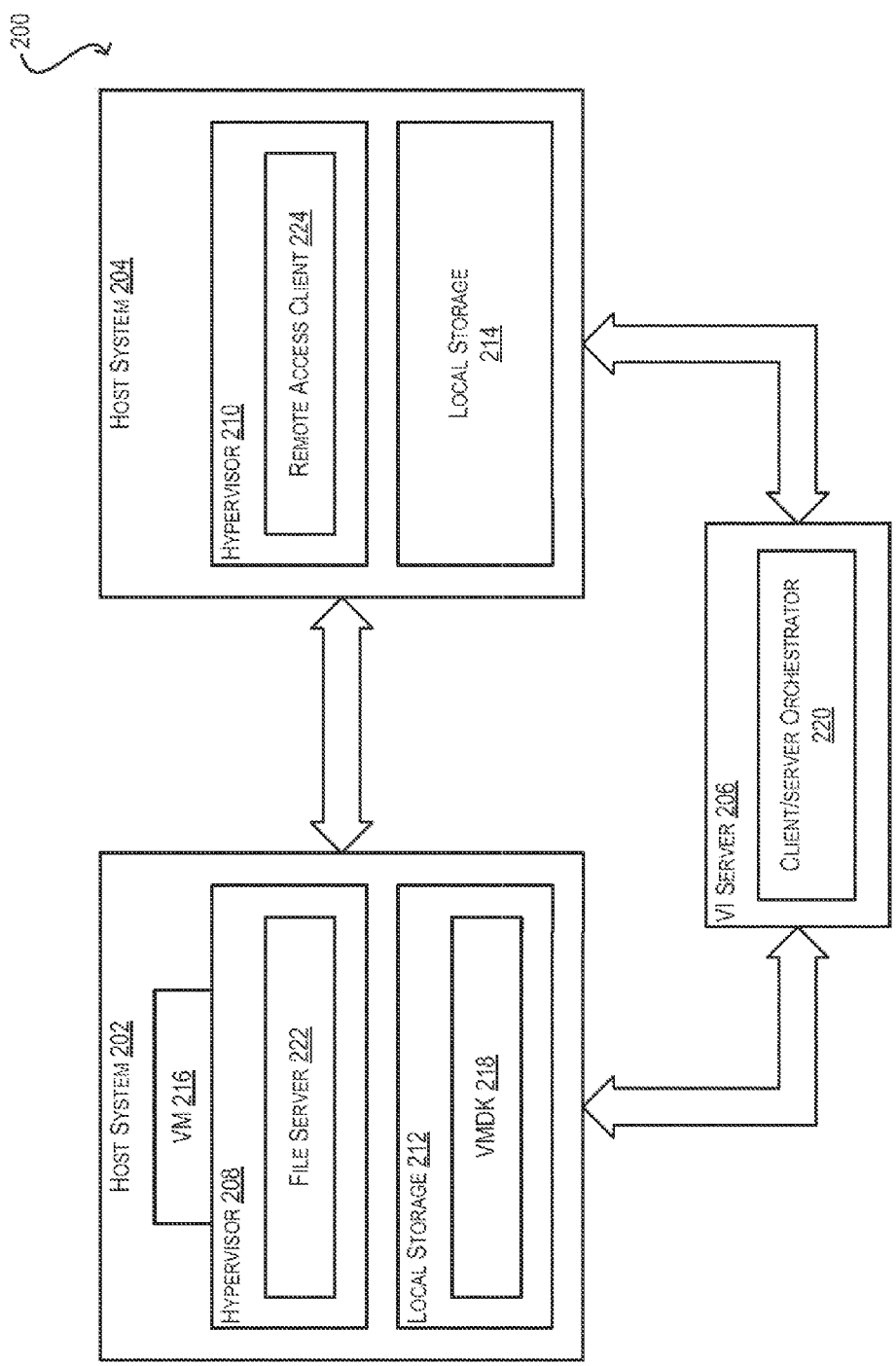
FIG. 2A depicts a system environment that supports instant xvMotion using a hypervisor-based client/server model according to an embodiment.

FIG. 2A depicts a system environment 200 that supports instant xvMotion using a hypervisor-based client/server model according to an embodiment. System environment 200 is similar in certain respects to system environment 100 of FIG. 1A; for example, system environment 200 includes two host systems 202 and 204 (each comprising hypervisors 208, 210 and local storage components 212, 214 respectively) and a VI server 206. Further, like host system 102 of FIG. 1A, host system 202 executes a VM 216 on hypervisor 208 that is configured to access a VMDK 218 residing on local storage component 212.

However, in addition to the foregoing components, system environment 200 includes a client/server orchestrator 220 (running on VI server 206), a file server 222 (within hypervisor 208 of host system 202), a remote access client 224 (within hypervisor 210 of host system 204). Collectively, components 220, 222, and 224 can establish a client/server connection between hypervisors 208 and 210 at the time of migrating VM 216 from host system 202 to host system 204, thereby allowing hypervisor 210 to remotely access VMDK 218. This effectively enables the instant xvMotion of VM 216 (i.e., the migration of VM 216, without transferring VMDK 218).

Figure 2B:
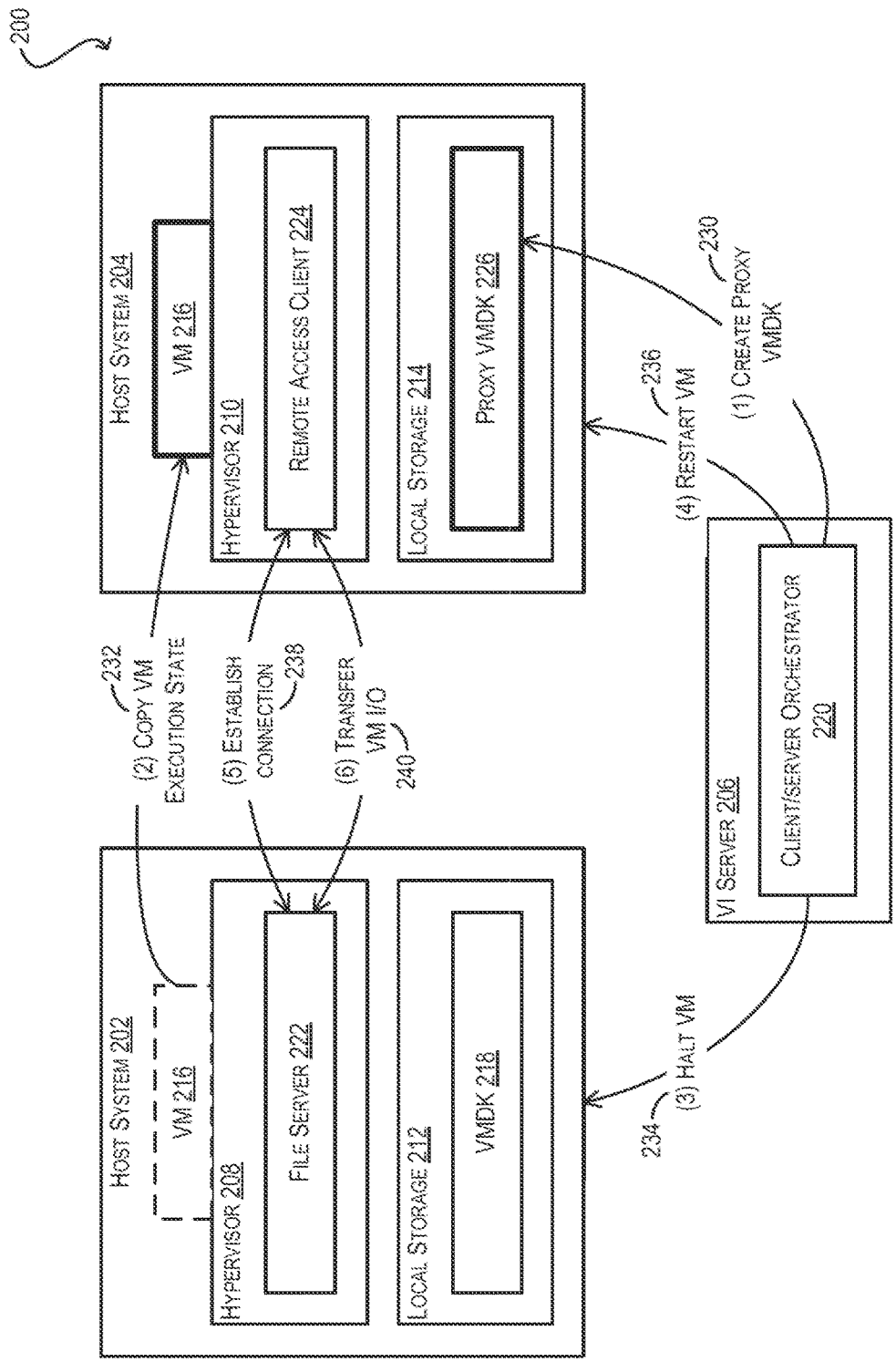
FIG. 2B depicts an instant xvMotion workflow in the system environment of FIG. 2A according to an embodiment.

To clarify the operation of orchestrator 220, file server 222, and remote access client 224, FIG. 2B depicts a high-level workflow that can be performed by these components for migrating VM 216 from host system 202 to host system 204 via instant xvMotion according to an embodiment. At step (1) of FIG. 2B (reference numeral 230), the migration process can be initiated and orchestrator 220 can create a "proxy VMDK" 226 on local storage component 214 of host system 204. In various embodiments, proxy VMDK 226 is not an actual VMDK; instead, proxy VMDK 226 is a lightweight file (e.g., a VMDK descriptor file) that serves as a proxy, or access point, for remotely accessing VMDK 218 residing on local storage component 212 of host system 202. Accordingly, proxy VMDK 226 can include information usable by host system 204 for establishing a remote access connection to host system 202. For example, in a particular embodiment, proxy VMDK 226 can include the hostname/IP address of host system 202, the location/file path of VMDK 218, and/or security metadata for logging into file server 222.

After (or concurrently with) the creation of proxy VMDK 226, orchestrator 220 can copy the execution state (e.g., volatile memory contents) of VM 216 from host system 202 to host system 204 (step (2); reference numeral 232). This copying can be substantially similar to step 2 (reference numeral 122) in the conventional xvMotion workflow of FIG. 1B. Orchestrator 220 can then halt/stun VM 216 on host system 202 (step (3); reference numeral 234) and restart VM 216 on host system 204 (step (4); reference numeral 236).

Once VM 216 has been restarted on host system 204, remote access client 224 can detect the presence of proxy VMDK 226 on local storage component 214 and can establish a client/server connection to file server 222 of host system 202 based on the information in the proxy VMDK (step (5); reference numeral 238). As part of this step, if security metadata is present, remote access client 224 can use the security metadata to authenticate itself to file server 222.

Finally, as I/O requests for VMDK 218 are generated by VM 216 on host system 204, remote access client 224 can forward the I/O requests over the client/server connection to file server 222 (step (6); reference numeral 240). File server 222 can, in turn, process the I/O requests by accessing VMDK 218 and return responses to remote access client 224 (which are subsequently propagated back to VM 216). In this manner, VM 216 can be executed on host system 204 while maintaining VMDK 218 on host system 202.

Figure 3:
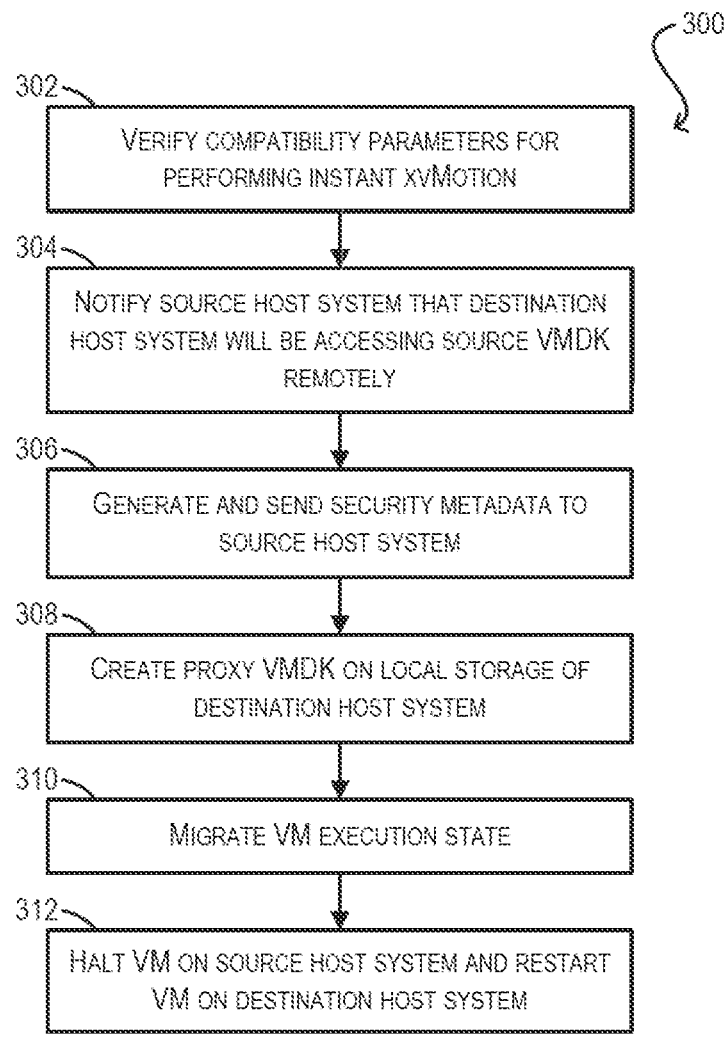
FIG. 3 depicts a process performed by a VI server in the instant xvMotion workflow of FIG. 2B according to an embodiment.

FIG. 3 depicts a flowchart 300 that provides additional details regarding the processing that may be performed by orchestrator 220 in the instant xvMotion workflow of FIG. 2B according to an embodiment. At block 302, orchestrator 220 can first verify certain compatibility parameters for performing instant xvMotion of VM 216 from host system 202 to host system 204. For example, orchestrator 220 can verify that host systems 202 and 204 have CPUs with comparable virtualization features, verify that hypervisors 208 and 210 both support instant xvMotion, and so on.

If host systems 202 and 204 are deemed compatible for instant xvMotion purposes, orchestrator 220 can notify host system 202 (i.e., the source host system) that host system 204 (i.e., the destination host system) will be accessing VMDK 218 (i.e., the source VMDK) remotely (block 304). Thus, host system 202 can be made aware that host system 204 will attempt to establish a client/server connection to system 202 once VM 216 has been migrated. In addition, orchestrator 220 can generate and send security metadata to host system 202 for authenticating host system 204 (block 306).

At block 308, orchestrator 220 can create proxy VMDK 226 on local storage component 214 of host system 204. As noted previously, proxy VMDK 226 can include information usable by host system 204 for remotely accessing VMDK 218 on host system 202, such as the hostname/IP address of host system 202 and the file location of VMDK 218. Proxy VMDK 226 can also include security metadata that is identical (or complementary) to the security metadata sent to host system 202 at block 306.

At block 310, orchestrator 220 can then cause the execution state of VM 216 to be transferred from host system 202 to host system 204, without transferring VMDK 218. Orchestrator 220 can then halt/stun VM 216 on host system 202 and restart VM 216 on host system 204, thereby completing the migration process (block 312).

Figure 4:
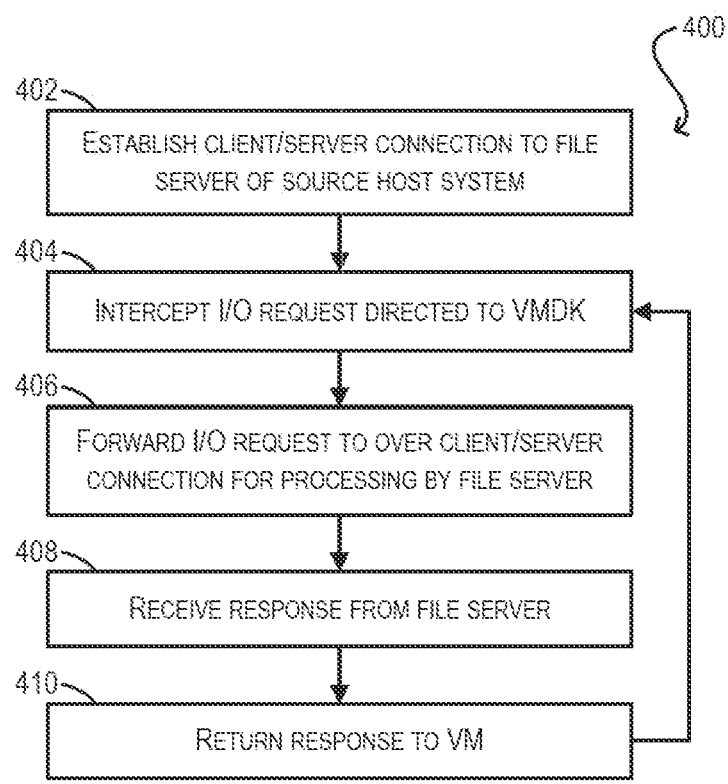
FIG. 4 depicts a process performed by a destination host system in the instant xvMotion workflow of FIG. 2B according to an embodiment.

FIG. 4 depicts a flowchart 400 that provides additional details regarding the processing that may be performed by remote access client 224 in the instant xvMotion workflow of FIG. 2B according to an embodiment. Flowchart 400 can be initiated after VM 216 has been restarted on host system 204 (per step (5) of the workflow).

At block 402, remote access client 224 can establish, using the information in proxy VMDK 226, a client/server connection to file server 222 for remotely accessing VMDK 218. In one embodiment, this connection can make use of a proprietary client/server protocol. In other embodiments, this connection can make use of one of a number of standard protocols. As part of block 402, if proxy VMDK 226 includes security metadata, remote access client 224 can pass the security metadata to file server 222 for authentication.

At block 404, while VM 216 is executing on host system 204, remote access client 224 can intercept an I/O request from VM 216 that is directed to VMDK 218. In a particular embodiment, this processing can occur at the vSCSI layer of hypervisor 210. Remote access client 224 can then forward the I/O request over the client/server connection established at block 402 so that the request can be processed by file server 222 (block 406).

At block 408, remote access client 224 can receive a response to the forwarded I/O request from file server 222. For example, if the I/O request was a read request, the response can include data for the requested data blocks. Finally, remote access client 224 can return the response to VM 216 (block 410). In various embodiments, remote access client 224 can repeat blocks 404-410 as additional I/O requests are received from VM 216, thereby funneling those additional I/O requests over the client/server connection for fulfillment/processing by file server 222.

Figure 5:
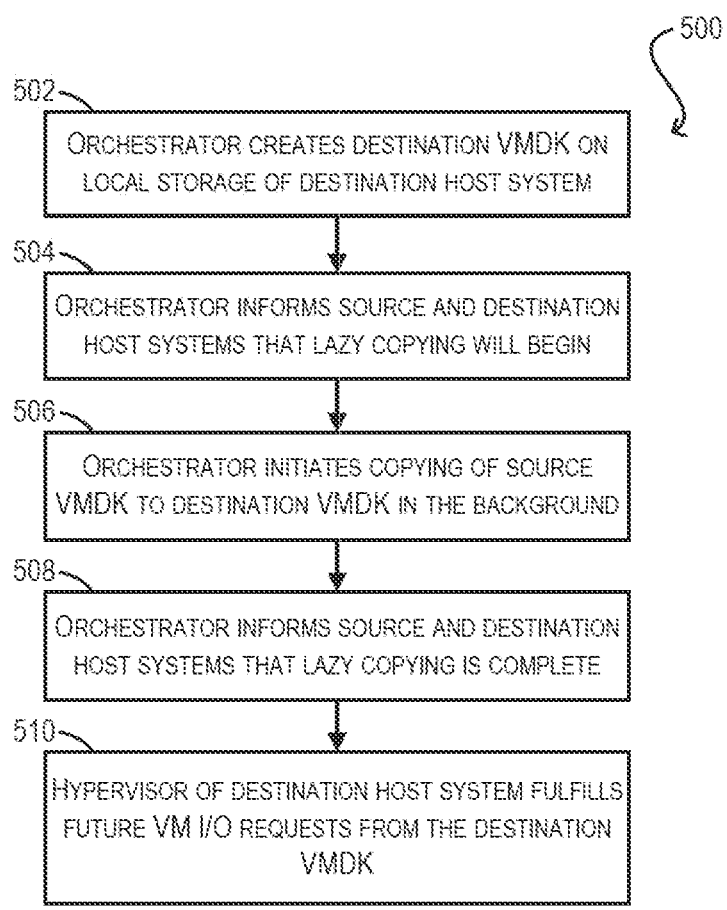
FIG. 5 depicts a process for enabling lazy VMDK copying during the instant xvMotion workflow of FIG. 2B according to an embodiment.

In some cases, it may be desirable to copy VMDK 218 from host system 202 to host system 204 as a "lazy" process, after the instant xvMotion workflow of FIG. 2B. For instance, there may be a situation where VM 216 needs to be migrated immediately to host system 204 via instant xvMotion (for, e.g., load balancing), but the eventual goal is to free up disk resources on local storage component 212 of host system 202 by moving VMDK 218 over to local storage component 214 of host system 204. FIG. 5 depicts a flowchart 500 for performing such a "lazy copy" process according to an embodiment. Flowchart 500 can be carried out concurrently with flowchart 400 of FIG. 4.

At block 502, orchestrator 220 can create a destination VMDK on local storage component 214 of host system 204 (i.e., the destination host system). The destination VMDK will eventually hold the full contents of VMDK 218 (i.e., the source VMDK). Orchestrator 220 can then inform host systems 202 and 204 that the lazy copy process will begin (block 504), and can start copying VMDK 218 to the destination VMDK as a background process (block 506). In one embodiment, this background copying can be performed over the same client/server connection established by remote access client 224 at block 402 of FIG. 4. In alternative embodiments, this background copying can be performed over a separate communication channel.

Once VMDK 218 has been transferred in its entirety to the destination VMDK, orchestrator 220 can inform host systems 202 and 204 that the lazy copy process is complete (block 508). Finally, at block 510, hypervisor 210 of host system 204 can satisfy future I/O requests directed to VMDK 218 from the destination VMDK, rather than forwarding those requests over the client/server connection for fulfillment by host system 202. Thus, the local disk resources previously consumed by VMDK 218 on host system 202 can be reused for other purposes.

In certain embodiments, while the lazy copying of FIG. 5 is in-process, remote access client 224 can optionally check (at, e.g., block 404 of FIG. 4) whether the data blocks requested by an intercepted I/O request are already synchronized to the destination VMDK. If so, remote access client 224 can retrieve the data directly from the destination VMDK; otherwise, the I/O request can be sent over the client/server connection to file server 222 per block 406 of FIG. 4. In this way, remote access client 224 can optimize the I/O path and avoid unnecessary roundtrips between host systems 202 and 204.

Further, if remote access client 224 receives data blocks (via a response from file server 222 or a write request from VM 216) that have not yet been propagated to the destination VMDK via the lazy copying of FIG. 5, remote access client 224 can directly populate those data blocks in the destination VMDK and mark those data blocks as synced. This speeds up the lazy copy process, since VMDK data blocks that have been explicitly requested or written to by VM 216 will not need to be transferred again in the background from host system 202 to host system 204.

3. Private Storage Virtual Appliance (PSVA)

As an alternative to the client/server approach described above, instant xvMotion can also be implemented in a manner that relies on a "private storage virtual appliance" (PSVA) for remote file access. Generally speaking, a storage virtual appliance (SVA) is a VM that aggregates and exposes a set of local storage LUNs (i.e., logical disks) as a network storage device for public consumption by other VMs/hosts. However, a conventional SVA needs to be manually created and configured by a storage administrator. In addition, host systems that wish to consume a conventional SVA need to be manually configured to access the SVA as a shared resource. Thus, conventional SVAs do not solve the problem of enabling VM migration across host systems that rely solely on host-based local storage.

In contrast, a PSVA is a novel variant of SVAs that has several unique properties. First, a PSVA can be configured/created automatically at, e.g., a source host system at the time of migrating a VM to a destination host system. Thus, there is no storage administration overhead associated with the PSVA. Second, a PSVA can be "locked" for the specific purpose of exposing VMDK(s) on the source host system's local storage as a network storage device to the destination host system. For example, the PSVA can be configured to be accessible/visible only to the destination host system (hence the "private" designation). Further, the PSVA can be configured to solely expose the VMDK(s) of the VM being migrated (rather than entire LUNs on the source host system). Taken together, these properties allow PSVAs to securely and dynamically enable remote file access between the source and destination host systems for instant xvMotion.

Figure 6A:
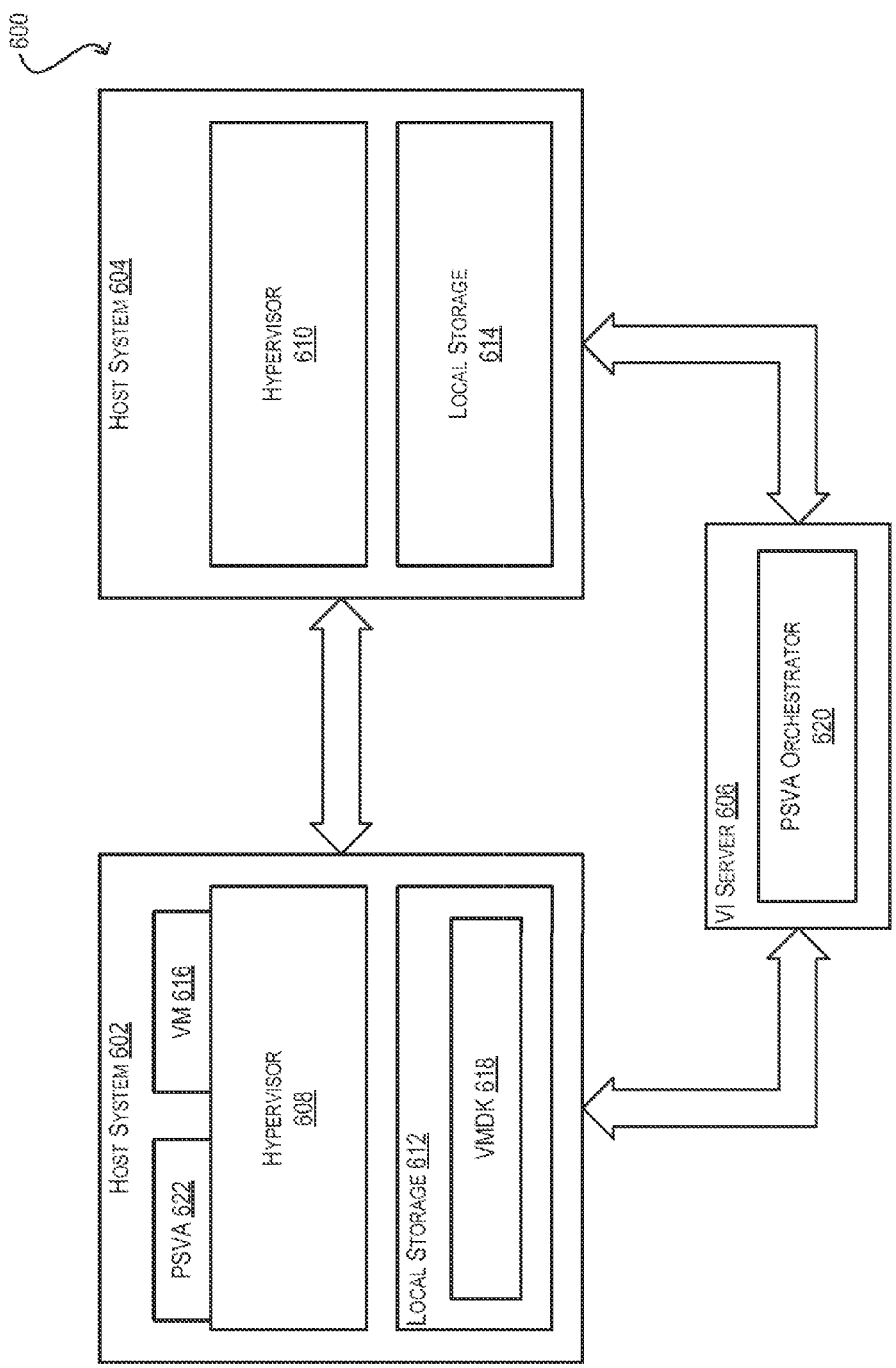
FIG. 6A depicts a system environment that supports instant xvMotion using a private storage virtual appliance according to an embodiment.

FIG. 6A depicts a system environment 600 that supports instant xvMotion using a PSVA according to an embodiment. Host systems 602/604, VI server 606, hypervisors 608/610, local storage components 612/614, VM 616, and VMDK 618 of system environment 600 are substantially similar to their corresponding components in system environment 200 of FIG. 2A. But, in place of client/server orchestrator 220, file server 222, and remote access client 224, system environment 600 includes a PSVA orchestrator 620 (running on VI server 606) and a PSVA 622 (running on hypervisor 608). Components 620 and 622 can enable the migration of VM 616 from host system 602 to host system 604, without transferring VMDK 218, per the high-level workflow depicted in FIG. 6B.

Figure 6B:
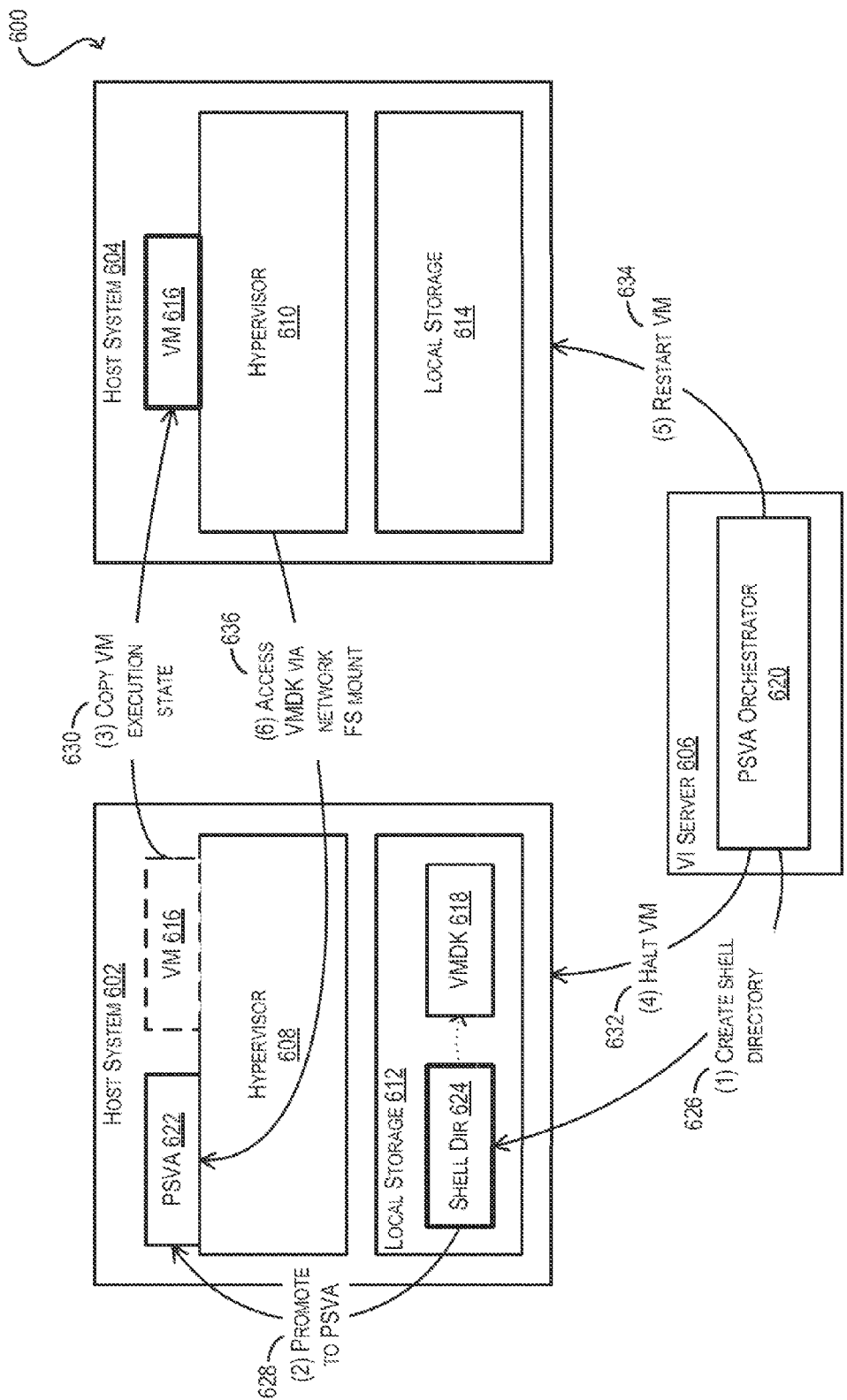
FIG. 6B depicts an instant xvMotion workflow in the system environment of FIG. 6A according to an embodiment.

At step (1) of FIG. 6B (reference numeral 626), orchestrator 620 can create a shell directory 624 in local storage component 612 of host system 602. Shell directory 624 can comprise a symbolic link to VMDK 618 (as shown by the dotted line), as well as symbolic links to other files associated with VMDK 618, such as descriptor files, flat files, etc. In this way, orchestrator 620 can dynamically compartmentalize VMDK 618 from the other files/directories on local storage component 612 for the purposes of instant xvMotion.

At step (2) (reference numeral 628), orchestrator 620 can "promote" shell directory 624 to PSVA 622. This promotion operation makes shell directory 624 visible to PSVA 622, such that shell directory 624 (and thus, VMDK 618) can be exposed by PSVA 622 as a network storage device to host system 204. In one embodiment, the promotion can be performed via a "backdoor" file interface, such as HGFS (host-guest file system).

Note that, since shell directory 624 solely includes links to VMDK 618 and its related files, the other files/directories on local storage component 612 remain hidden from host system 604. This differs from conventional SVAs, which typically make available entire LUNs from local storage.

Further, as part of step (2), orchestrator 620 can setup access permissions that prevent systems other than host system 204 from accessing shell directory 624 (in the form of the exposed network storage device). This also differs from conventional SVAs, which typically do not place any restrictions on the type or number of consumers that can access its exposed data.

Once shell directory 624 has been promoted and exposed by PSVA 622, orchestrator 620 can copy the execution state of VM 616 from host system 602 to host system 604 (step (3); reference numeral 630) in a manner that is similar to step (2) of FIG. 2B. Orchestrator 620 can then halt/stun VM 616 on host system 602 (step (4); reference numeral 632) and restart VM 616 on host system 604 (step (5); reference numeral 634).

Finally, at step (6) (reference numeral 636), hypervisor 610 of host system 604 can mount and access the network storage device exposed by PSVA 622. In this way, hypervisor 610 can read from/write to shell directory 624/VMDK 618 in response to I/O requests from VM 616. Unlike the client/server approach described in Section 2, there is no need for a custom client within hypervisor 610 to achieve this remote file access; instead, shell directory 614 can simply be accessed like a conventional network storage device (e.g., an NFS device).

Figure 7:
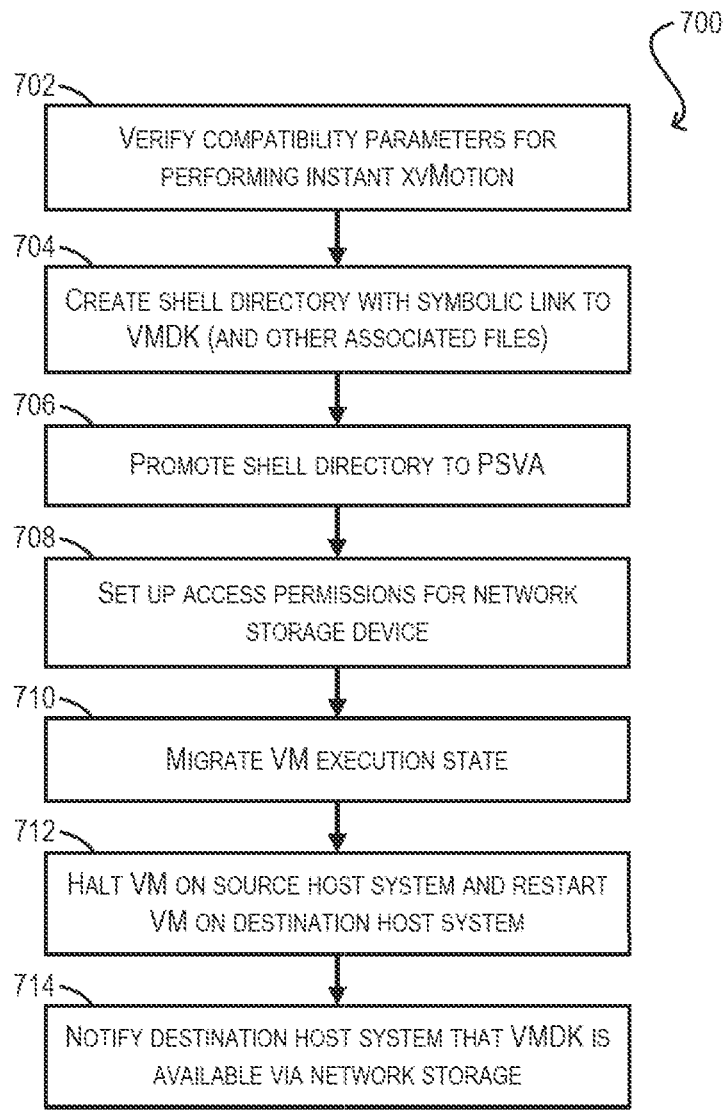
FIG. 7 depicts a process performed by a VI server in the instant xvMotion workflow of FIG. 6B according to an embodiment.

FIG. 7 depicts a flowchart 700 that provides additional details regarding the processing that may be performed by PSVA orchestrator 620 in the instant xvMotion workflow of FIG. 6B according to an embodiment. At block 702, orchestrator 620 can first verify certain compatibility parameters for performing instant xvMotion of VM 616 from host system 602 to host system 604. For example, orchestrator 620 can verify that host systems 602 and 604 have CPUs with comparable virtualization features, verify that hypervisors 608 and 610 both support instant xvMotion, and so on.

If host systems 602 and 604 are deemed compatible for instant xvMotion purposes, orchestrator 620 can create shell directory 624 (with symbolic link(s) to VMDK 618 and other related files) within local storage component 612 of host system 602 (block 704). Orchestrator 620 can also promote shell directory 624 to PSVA 622, thereby enabling PSVA 622 to expose the directory as a network storage device (block 706). As part of this promotion process, orchestrator 620 can setup access permissions in such a way that only the destination host system (i.e., host system 204) has access to the exposed network storage device (block 708).

At blocks 710 and 712, orchestrator 620 can complete the migration process by migrating the execution state of VM 616, halting/stunning the VM on host system 602, and restarting the VM on host system 604. Finally, orchestrator 620 can notify destination host system 204 that shell directory 624/VMDK 616 is available via the network storage device exposed by PSVA 622 (block 714). In response, hypervisor 610 of host system 604 can mount and access the device like conventional shared storage.

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory (e.g., a flash memory device), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for migrating a virtual machine (VM) from a source host system to a destination host system, the VM being associated with a source virtual disk file (VMDK) residing in a local storage component of the source host system, the method comprising:
    creating, by a virtual infrastructure (VI) server at a time of initiating migration of the VM from the source host system to the destination host system:
        a directory in the local storage component of the source host system, the directory including a link to the source VMDK; and
        a private virtual storage appliance (PSVA) on the source host system, the PSVA being another VM that is configured to expose the directory as a network storage device to the destination host system without exposing other files or directories resident on the local storage component of the source host system to the destination host system;
    promoting, by the VI server, the directory to the PSVA, the promoting causing the directory to be visible to the PSVA and setting one or more access permissions on the network storage device that prevent host systems other than the destination host system from accessing the network storage device;
    causing, by the VI server, an execution state or the VM to be transferred from the source host system to the destination host system without transferring the source VMDK; and
    notifying, by the VI server, the destination host system that the source VMDK is available for remote file access via the network storage device exposed by the PSVA.

2. The method of claim 1 wherein the directory excludes the other files or directories on the local storage component of the source host system.

3. The method of claim 1 further comprising:
    halting the VM on the source host system; and
    restarting the VM on the destination host system.

4. The method of claim 3 further comprising, subsequently to restarting the VM on the destination host system:
    mounting, by the destination host system, the network storage device exposed by
    the PSVA; and
    accessing, by the destination host system, the source VIVIDK via the mounted network storage device.

5. The method of claim wherein the promoting of the directory to the PSVA is also performed automatically by the VI server at the time of migrating the VM.

6. A non-transitory computer readable storage medium having stored thereon computer software executable by a processor of a VI server, the computer software embodying a method for migrating a VM from a source host system to a destination host system, the VM being associated with a source VMDK residing in a local storage component of the source host system, the method comprising:
    creating, at a time of initiating migration of the VM from the source host system to the destination host system;
        a directory in the local storage component of the source host system, the directory including a link to the source VMDK; and
        a private virtual storage appliance (PSVA) on the source host system, the PSVA being another VM that is configured to expose the directory as a network storage device to the destination host system without exposing other files or directories resident on the local storage component of the source host system to the destination host system;
    promoting the directory to the PSVA, the promoting causing the directory to be visible to the PSVA and setting one or more access permissions on the network storage device that prevent host systems other than the destination host system from accessing the network storage device;
    causing an execution state of the VM to be transferred from the source host system to the destination host system without transferring the source VMDK; and
    notifying the destination host system that the source VMDK is available for remote the access via the network storage device exposed by the PSVA.

7. The non-transitory computer readable storage medium of claim 6 wherein the directory excludes the other files or directories on the local storage component of the source host system.

8. The non-transitory computer readable storage medium of claim 6 wherein the method Further comprises:
    halting the VM on the source host system; and restarting the VM on the destination host system.

9. The non-transitory computer readable storage medium of claim 8 wherein, subsequently to restarting the VM on the destination host system, the destination host system is configured to:
   mount the network storage device exposed by the PSVA; and access the source VMDK via the mounted network storage device.

10. The non-transitory computer readable storage medium of claim 6 wherein the promoting of the directory to the PSVA is also performed automatically by the VI server at the time of migrating the VM.

11. A server system for facilitating migration of a VM from a source host system to a destination host system, the VM being associated with a source VMDK residing in a local storage component of the source host system, the server system comprising:
   a processor; and
   a non-transitory computer readable medium having stored thereon instructions that, when executed by the processor, causes the processor to:
      create, at a time of initiating migration of the VM from the source host system to the destination host system:
         a directory in the local storage component of the source host system, the directory including a link to the source VMDK; and
         a private virtual storage appliance (PSVA) on the source host system, the PSVA being another VM that is configured to expose the directory as a network storage device to the destination host system without exposing other files or directories resident on the local storage component of the source host system to the destination host system;
      promote the directory to the PSVA, the promoting causing the directory to be visible to the PSVA and setting one or more access permissions on the network storage device that prevent host systems other than the destination host system from accessing the network storage device;
      cause an execution state of the VM to be transferred from the source host system to the destination host system without transferring the source VMDK; and
      notify the destination host system that the source VMDK is available for remote file access via the network storage device exposed by the PSVA.

12. The server system of claim 11 wherein the directory excludes the other files or directories on the local storage component of the source host system.

13. The server system of claim 11 wherein the instructions further cause the processor to:
   halt the VM on the source host system; and
   restart the VM on the destination host system.

14. The server system of claim 13 wherein, subsequently to restarting the VM on the destination host system, the destination host system is configured to:
   mount the network storage device exposed by the PSVA; and
   access the source VMDK via the mounted network storage device.

15. The server system of claim 11 wherein the promoting of the directory to the PSVA is also performed automatically by the processor at the time of migrating the VM.

16. The method of claim 1 wherein the promoting of the directory to the PSVA is performed using a host-guest file system interface.

17. The non-transitory computer readable storage medium of claim 6 wherein the promoting of the directory to the PSVA is performed using a host-guest file system interface.

18. The server system of claim 11 wherein the promoting of the directory to the PSVA is performed using a host-guest file system interface.

* * * * *